UNITED STATES PATENT OFFICE.

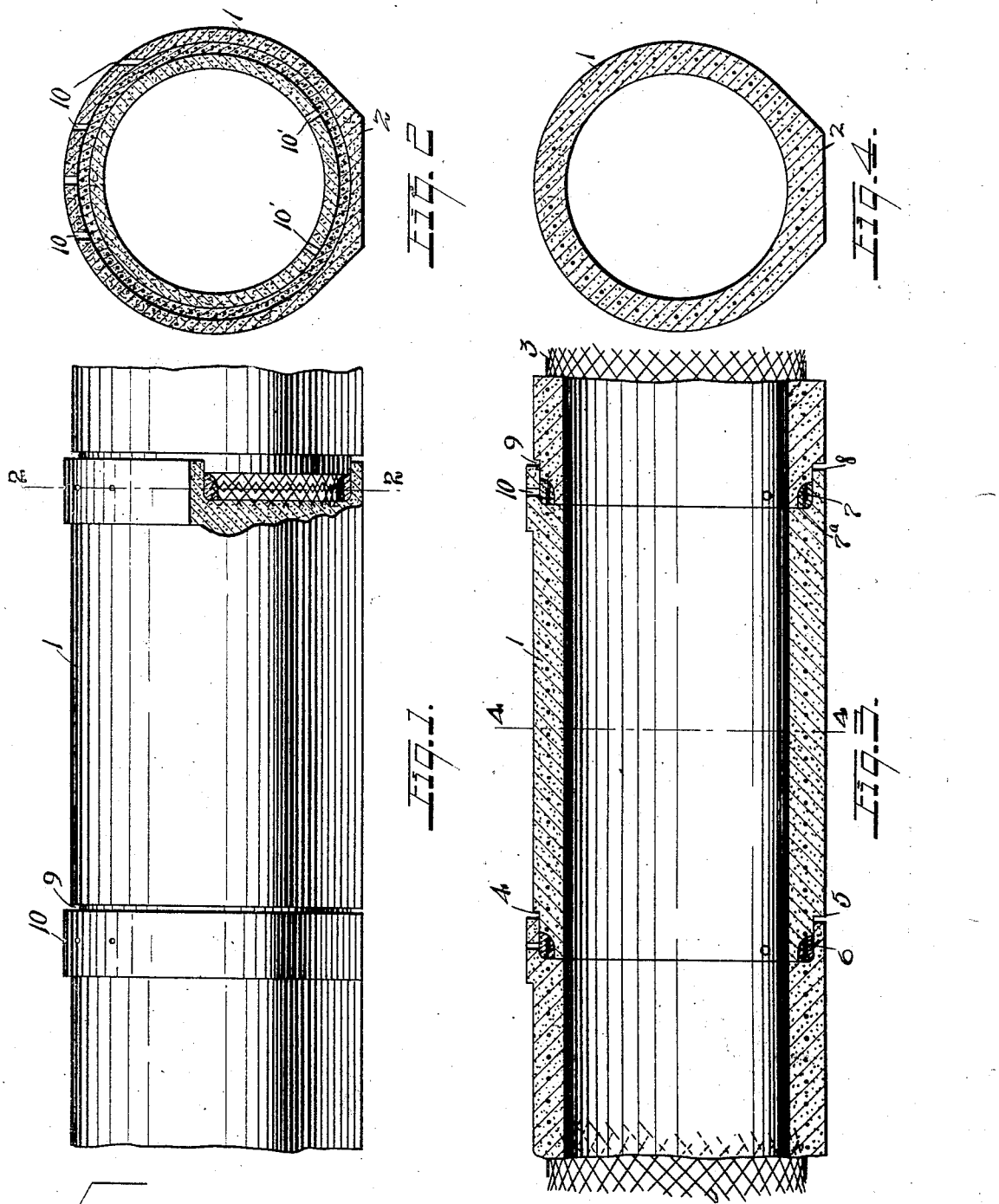

WALTER C. PARMLEY, OF UPPER MONTCLAIR, NEW JERSEY.

CONCRETE PIPE.

1,133,313.        Specification of Letters Patent.        Patented Mar. 30, 1915.

Application filed August 4, 1910. Serial No. 575,587.

*To all whom it may concern:*

Be it known that I, WALTER C. PARMLEY, a citizen of the United States, residing at Upper Montclair, in the county of Essex and State of New Jersey, have invented a certain new and useful Improvement in Concrete Pipes, of which the following is a full, clear, and exact description.

My invention relates to concrete pipes and more particularly to the form of joint for connecting adjacent sections of the pipe.

The object of the invention is to provide a pipe, the opposite ends of which are formed to coöperate with ends of adjacent sections so that each section may be self-centering, and furthermore, to provide grooves in the adjacent sections which coöperate to form a blind recess for the purpose of receiving mortar or grout, and thereby forming a perfect joint between the adjacent sections of pipe.

Generally speaking, the invention comprises the elements and combinations thereof set forth in the accompanying claims.
Reference should be had to the accompanying drawings, in which—

Figure 1 is a side elevation of a plurality of sections of pipe in assembled position, certain portions being shown in section; Fig. 2 is a section upon the line 2—2 of Fig. 1; Fig. 3 is a central vertical section of the showing in Fig. 1; and Fig. 4 is a section upon the line 4—4 of Fig. 3.

The common hub and spigot pattern for connecting pipe sections, which is well known in the art, presents great difficulties to obtaining a perfect joint, on account of the difficulty of obtaining a joint completely filled with mortar. Furthermore, it often happens that the spigot sinks down in the mortar and thus throws the pipes out of alinement.

It has been proposed to provide an external groove, and in connection therewith, a band encircling the pipe inclosing the groove and thereafter filling the groove with mortar, but, in such a construction, there is great danger that the band will be displaced and sand or grit become jammed into the place intended for the mortar. In those pipes which are provided with an internal groove, it is practically impossible to prevent water washing the mortar out of place before it has had time to harden.
The purpose of this invention is to provide a groove between adjacent sections of pipe to which the water through the pipe does not have ready access, and further, to provide a blind groove, which, being filled with mortar in the form of grout forms a perfect connection between the adjacent pipe sections.

The pipes are preferably formed by molding, and such a molded pipe is represented at 1. The lower portion of the pipe is formed with a flattened base, as indicated at 2, which forms a suitable foundation upon which the pipe may rest and thereby prevent the rolling of the pipe after it has once been laid in position.

Added strength is given to the pipes by providing some form of reinforcing elements therein, and for this purpose I have shown a woven wire mat or screen, indicated at 3, which is molded in the walls of the pipe and extends a short distance beyond each end thereof. Other forms of reinforcing elements may be used, where desired, the point being that they shall extend beyond the ends of the pipe for a purpose to be later described.

At one end, the pipe is formed with an extending portion or spigot 4, which is of slightly less diameter than the exterior of the pipe and provides a shoulder 5. At the extreme end, the spigot is formed with an annular groove, represented at 6. This groove is usually formed to be rounding in character and assumes the form substantially as shown in Fig. 3. The opposite end or hub end of the pipe is formed with a recessed portion 7, which is of greater diameter than the interior of the pipe and provides a shoulder 7ª. The depth of the recess 7 is not quite so great as the length of the spigot 4.

A section of pipe is formed at its opposite ends in the manner suggested and the end having the groove 7 is adapted to coöperate with an adjacent section of pipe formed with the groove 6. The extending portion 4 of each pipe is formed of such a length that the spigot end of one section of pipe may abut against the shoulder 7ª of the hub and still provide a slight space between the abutting pipe sections, which is represented at 9. By the provision of such a space, the pipes may be shoved together, and be placed so that the ends coöperate in the manner suggested in Fig. 3, without hindrance from gravel or dirt which might collect in front of the shoulder 5, as the pipes are shoved together. Such gravel as collects may occupy the space in the groove 9 and not prevent the pipe sections from a close fit.

The spigot or extension 4 is substantially the same in external diameter as the internal diameter of the recess 7, so that when the adjacent sections of pipe coöperate, as shown in Fig. 3, the adjacent sections are correctly centered.

The groove 6 will coöperate with the recess 7 when adjacent pipe sections are in their finally adjusted position, and into this space may be poured mortar or grout through the openings 10 or 10'. The mortar or grout, being soft, will flow around and fill the space provided by the grooves 6 and 7 and thus the joints between the pipes will be completely filled and packed. The extending reinforcing elements 3, which have before been mentioned, will extend into the space provided by the grooves 6 and 7 and will overlap each other, and, when the mortar is poured in and becomes hardened, an effective locking means is provided to hold the pipe sections together.

It will be apparent that when the various pipe sections are assembled, a continuous interior surface is provided, and furthermore, any water which may flow through the pipes, does not gain access to the mortar which fills the grooves. Therefore, the pipes may be put in use as soon as they are laid and before the mortar in the grooves becomes entirely hard, and this without danger of the water passing through the pipes washing the mortar away.

While I have shown the hub end of the pipe as having a portion of greater external diameter than the diameter of the remaining portion of the pipe, it will be apparent that such a projection is not necessary and that the pipe may be made of constant external diameter throughout its length.

Attention is called to the fact that re-entrant grooves are avoided in the joint between the pipes, wherefore the pipe may be withdrawn from the mold in which it is made by a motion parallel with the axis of the pipe. This is quite an important feature, for the reason that no special accessories are required for producing the grooves in the pipe and in this way the cost of manufacture is materially reduced.

Having thus described my invention, what I claim is:—

1. A concrete pipe section having a bell shaped end formed with a groove, the walls of the groove being substantially at right angles to each other, the opposite end of said pipe being formed with a projecting portion of less diameter than the pipe, and of substantially the same diameter as the interior of the groove in the bell end of the pipe, and a groove formed in the said projecting portion at the end thereof.

2. A concrete pipe section having a bell shaped end formed with a groove the walls of which are at substantially right angles to each other, the opposite end of said pipe section being formed with a projecting portion of less diameter than the pipe, and of substantially the same diameter as the interior diameter of the groove in the bell end of the pipe, said projecting portion being longer than the depth of the groove of the bell portion, and a groove formed in the said projecting portion at the end thereof.

In testimony whereof, I hereunto affix my signature in the presence of two witnesses.

WALTER C. PARMLEY.

Witnesses:
E. A. McDermott,
Ernest W. Eisenlohr.